United States Patent
Pillai

(10) Patent No.: US 9,122,637 B1
(45) Date of Patent: Sep. 1, 2015

(54) SYSTEMS AND METHODS FOR ENHANCING ELECTRONIC DISCOVERY SEARCHES

(75) Inventor: Biju Pillai, Pune (IN)

(73) Assignee: Symantec Corporation, Mountain View, CA (US)

(*) Notice: Subject to any disclaimer, the term of this patent is extended or adjusted under 35 U.S.C. 154(b) by 296 days.

(21) Appl. No.: 13/286,803

(22) Filed: Nov. 1, 2011

(51) Int. Cl.
*G06F 17/30* (2006.01)
*G06F 11/14* (2006.01)

(52) U.S. Cl.
CPC .................. *G06F 11/1448* (2013.01)

(58) Field of Classification Search
None
See application file for complete search history.

(56) References Cited

U.S. PATENT DOCUMENTS

| | | | |
|---|---|---|---|
| 7,831,544 B1 | 11/2010 | Panchbudhe et al. | |
| 8,176,069 B2 * | 5/2012 | Timm et al. | 707/767 |
| 8,239,348 B1 | 8/2012 | Bezbaruah et al. | |
| 8,341,177 B1 | 12/2012 | Bezbaruah et al. | |
| 8,380,687 B1 | 2/2013 | Panchbudhe et al. | |
| 8,402,048 B2 * | 3/2013 | Egi et al. | 707/769 |
| 8,510,389 B1 | 8/2013 | Gurajada et al. | |
| 8,707,299 B1 | 4/2014 | Bezbaruah et al. | |
| 2007/0185914 A1 * | 8/2007 | Prahlad et al. | 707/200 |
| 2007/0239610 A1 * | 10/2007 | Lemelson | 705/51 |
| 2010/0312754 A1 * | 12/2010 | Bear et al. | 707/685 |
| 2013/0060615 A1 * | 3/2013 | Block et al. | 705/14.11 |

OTHER PUBLICATIONS

Angshuman Bezbaruah, et al.; Method and Apparatus for Preventing Data Leakage of E-Discovery Data Items; U.S. Appl. No. 12/211,759, filed Sep. 16, 2008.

* cited by examiner

*Primary Examiner* — Sangwoo Ahn
(74) *Attorney, Agent, or Firm* — ALG Intellectual Property, LLC

(57) ABSTRACT

A computer-implemented method for enhancing electronic discovery searches may include (1) receiving a search query for at least one instance of a user being identified within a backup image of a volume of data, the search query being conducted for electronic discovery, (2) identifying metadata associated with the backup image specifying at least one action performed by the user on a computing system while the volume of data was mounted for use on the computing system, (3) performing the search query on the backup image and receiving a result of the search query in response to performing the search query, (4) enhancing the result of the search query with contextual information relating to the search query based on the metadata, the contextual information facilitating further electronic discovery, and (5) providing the enhanced result of the search query. Various other methods, systems, and computer-readable media are also disclosed.

20 Claims, 7 Drawing Sheets

SYSTEMS AND METHODS FOR ENHANCING ELECTRONIC DISCOVERY SEARCHES

BACKGROUND

In many countries, a party involved in a legal proceeding may obtain evidence from an opposing party through various "discovery" devices, such as requests for answers to interrogatories, requests for production of documents, and the like. In recent years, the rise of the information age has led to the increased role of electronic discovery (or "e-discovery") in legal proceedings, which involves the discovery of information in electronic format.

Electronic discovery during litigation can present significant burdens and expenses for various types of enterprises, particularly for larger enterprises that may be involved in hundreds of legal disputes at any given time. Locating and reviewing electronic documents relevant to a legal dispute may take weeks or months and cost hundreds of thousands of dollars. Traditional electronic discovery systems may allow an organization to search through backed up data, but an organization may have difficulty determining what searches might return the most relevant information. Accordingly, the instant disclosure identifies and addresses a need for additional and improved methods for enhancing electronic discovery searches.

SUMMARY

As will be described in greater detail below, the instant disclosure generally relates to systems and methods for enhancing electronic discovery searches by using contextual information that links actions that were performed on backed up data over time to provide contextualize search results, suggest additional searches, and/or perform additional searches. In one example, a computer-implemented method for enhancing electronic discovery searches may include (1) receiving a search query for at least one instance of a user being identified within a backup image of a volume of data, the search query being conducted for electronic discovery, (2) identifying metadata associated with the backup image specifying at least one action performed by the user on a computing system while the volume of data was mounted for use on the computing system, (3) performing the search query on the backup image and receiving a result of the search query in response to performing the search query, (4) enhancing the result of the search query with contextual information relating to the search query based on the metadata, the contextual information facilitating further electronic discovery, and (5) providing the enhanced result of the search query.

The computer-implemented method may enhance the result of the search query in any of a variety of ways. For example, enhancing the result of the search query may include suggesting a related search query based on the metadata. In this example, suggesting the related search query may include providing the related search query as an option within a navigable interface displaying the result of the search query. Additionally or alternatively, enhancing the result of the search query may include performing an additional search on the backup image based on the metadata and including a result of the additional search with the result of the search query.

In some examples, enhancing the result of the search query may include (1) identifying a file identifier within the result of the search query, (2) determining that the action performed by the user was performed on a file corresponding to the file identifier, and (3) contextualizing the file identifier within the result of the search query with a representation of the action. In these examples, enhancing the search query may also include contextualizing the representation of the action within a sequence of actions performed by the user on the computing system. Additionally or alternatively, in these examples enhancing the result of the search query may also include contextualizing the representation of the action within a sequence of actions performed by the user on the computing system that facilitated the action performed by the user on the file.

In one example, enhancing the result of the search query may include (1) identifying a file identified within the result of the search query which was owned by the user at the time that the backup image was generated, (2) identifying, within the metadata, an identifier of at least one additional user that owned the file prior to the user owning the file, and (3) including an indicator that the additional user owned the file prior to the user within the result of the search query. Additionally or alternatively, enhancing the result of the search query may include: (1) identifying, based on the metadata, at least one additional volume of data accessed by the user and (2) including a representation of the additional volume of data within the result of the search query.

In some embodiments, an additional computer-implemented method for enhancing electronic discovery searches may include: (1) monitoring a volume of data for an attempt to access a file on the volume of data, (2) recording the attempt to access the file, (3) identifying a request to back up the volume of data, and, in response to identifying the request, (4) associating the recorded attempt with a backup of the volume of data created in response to the request such that the recorded attempt facilitates electronic discovery performed on the backup of the volume of data.

Recording the attempt to access the file may include any of a variety of steps. For example, recording the attempt to access the file may include recording an identifier of a user account that attempted to access the file. Additionally or alternatively, recording the attempt to access the file may include: (1) identifying a user that performed the attempt to access the file, (2) recording at least one additional attempt by the user to access an additional file, and (3) associating the attempt to access the file with the additional attempt to access the additional file. In this example, associating the attempt to access the file with the additional attempt to access the additional file may include recording sequential information specifying an order in which the attempt and the additional attempt occurred. In some examples, recording the attempt to access the file may include recording contextual information specifying a context that facilitated the attempt to access the file and that is not reflected in the backup. Additionally or alternatively, recording the attempt to access the file may include: (1) identifying a user that performed the attempt to access the file, (2) identifying a search query performed by the user on at least a portion of the volume of data before the attempt, and (3) recording an association between the search query and the attempt.

In one embodiment, a system for implementing the above-described method may include (1) a receiving module programmed to receive a search query for at least one instance of a user being identified within a backup image of a volume of data, the search query being conducted for electronic discovery, (2) an identification module programmed to identify metadata associated with the backup image specifying at least one action performed by the user on a computing system while the volume of data was mounted for use on the computing system, (3) a performing module programmed to perform the search query on the backup image and receive a result of the search query in response to performing the search query, (4) an enhancing module programmed to enhance the result of the search query with contextual information relating to the search query based on the metadata, the contextual information facilitating further electronic discovery, and (5) a providing module programmed to provide the enhanced result of the search query. The system may also include at least one processor configured to execute the receiving module, identification module, the performing module, the enhancing module, and the providing module.

As will be explained in greater detail below, by using contextual information that links actions that were performed on backed up data over time (e.g., to provide contextualize search results, suggest additional searches, and/or perform additional searches), the systems and methods described herein may enable more efficient, thorough, and/or informative electronic discovery searches, thereby potentially saving organizations time and expenses during a discovery process and/or litigation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
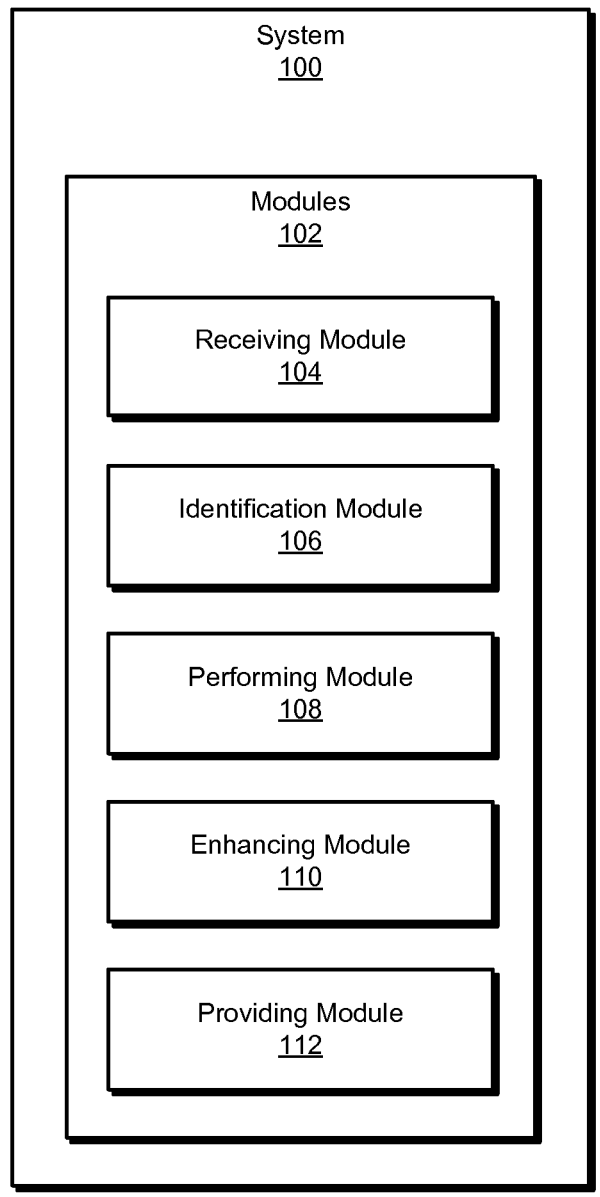
FIG. 1 is a block diagram of an exemplary system for enhancing electronic discovery searches.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
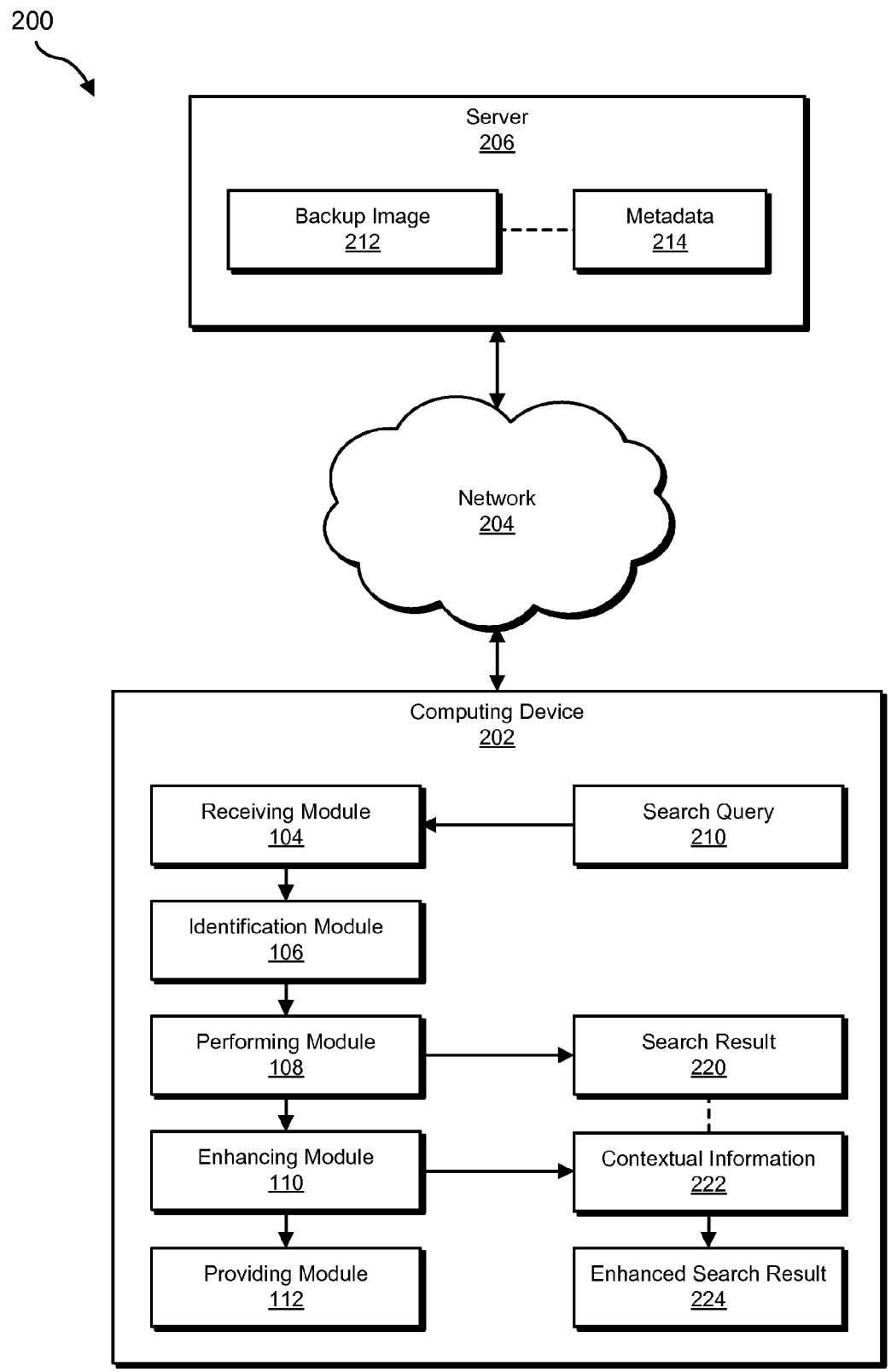
FIG. 2 is a block diagram of an exemplary system for enhancing electronic discovery searches.

The following will provide, with reference to FIGS. 1-2, detailed descriptions of exemplary systems for enhancing electronic discovery searches. Detailed descriptions of corresponding computer-implemented methods will also be provided in connection with FIGS. 3 and 5. Detailed descriptions of an exemplary context for enhancing electronic discovery searches will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for enhancing electronic discovery searches. As illustrated in this figure, exemplary system 100 may include one or more modules 102 for performing one or more tasks. For example, and as will be explained in greater detail below, exemplary system 100 may include a receiving module 104 programmed to receive a search query for at least one instance of a user being identified within a backup image of a volume of data, the search query being conducted for electronic discovery. Exemplary system 100 may also include an identification module 106 programmed to identify metadata associated with the backup image specifying at least one action performed by the user on a computing system while the volume of data was mounted for use on the computing system. Exemplary system 100 may additionally include a performing module 108 programmed to perform the search query on the backup image and receive a result of the search query in response to performing the search query.

In addition, and as will be described in greater detail below, exemplary system 100 may include an enhancing module 110 programmed to enhance the result of the search query with contextual information relating to the search query based on the metadata, the contextual information facilitating further electronic discovery. Exemplary system may also include a providing module 112 programmed to provide the enhanced result of the search query. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

In one embodiment, one or more of modules 102 from FIG. 1 may, when executed by at least one processor of computing device 202, facilitate computing device 202 in enhancing electronic discovery searches. For example, and as will be described in greater detail below, receiving module 104, identification module 106, performing module 108, enhancing module 110, and/or providing module 112 may cause computing device 202 to enhance electronic discovery searches. For example, receiving module 104 may be programmed to receive a search query 210 for at least one instance of a user being identified within a backup image 212 of a volume of data, the search query 210 being conducted for electronic discovery. Identification module 106 may be programmed to identify metadata 214 associated with backup image 212 specifying at least one action performed by the user on a computing system while the volume of data was mounted for use on the computing system, performing module 108 may be programmed to perform search query 210 on backup image 212 and receive a search result 220 of search query 210 in response to performing search query 210. Enhancing module 110 may be programmed to enhance search result 220 of search query 210 with contextual information 222 relating to search query 210 based on metadata 214 (e.g., resulting in an enhanced search result 224), where contextual information 222 facilitates further electronic discovery. Providing module 112 may be programmed to provide enhanced search result 224 of search query 210.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

Server 206 generally represents any type or form of computing device that is capable of storing, handling, retrieving, and/or searching a backup image. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN) a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
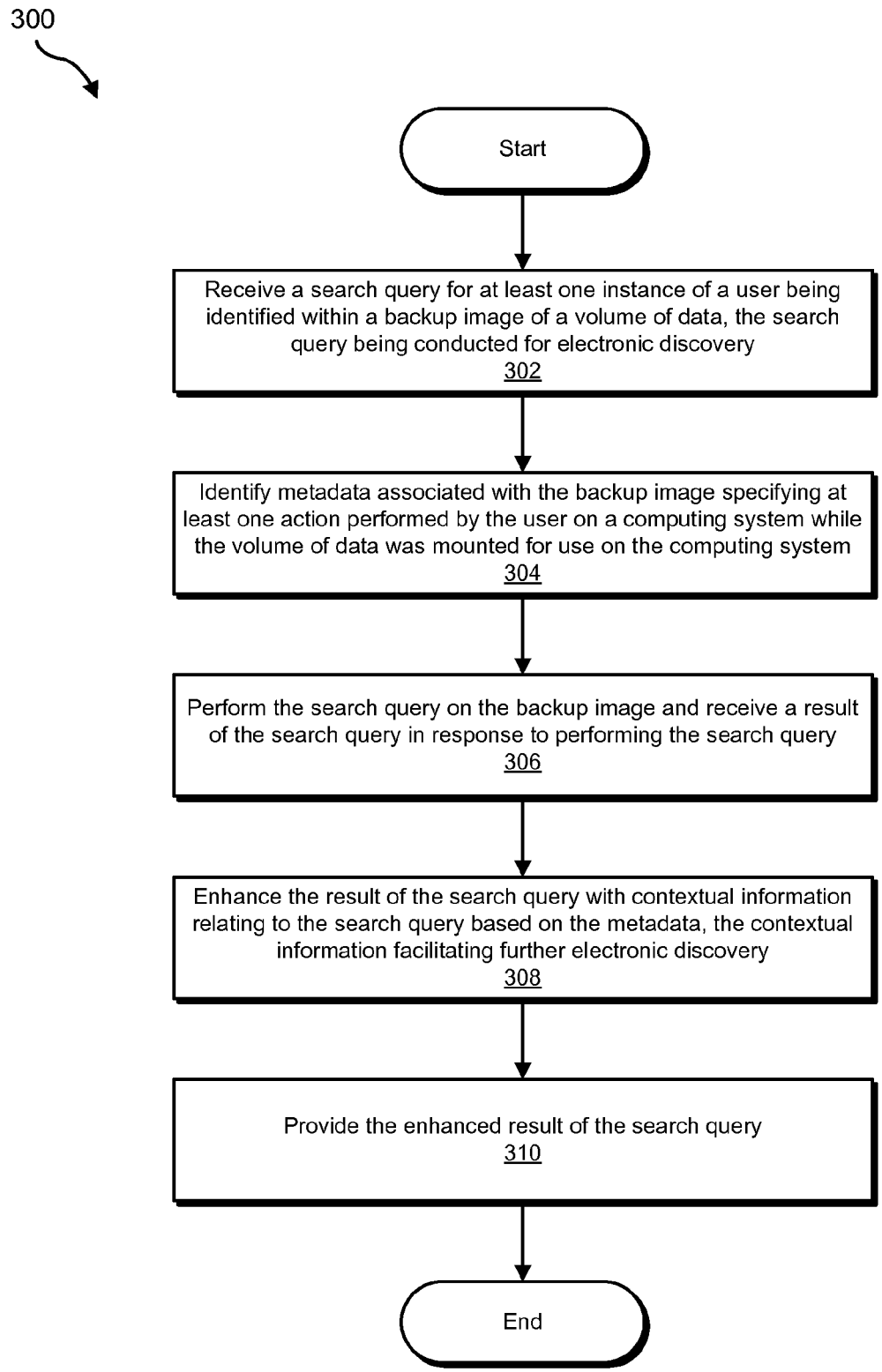
FIG. 3 is a flow diagram of an exemplary method for enhancing electronic discovery searches.

FIG. 3 is a flow diagram of an exemplary computer-implemented method 300 for enhancing electronic discovery searches. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may receive a search query for at least one instance of a user being identified within a backup image of a volume of data, the search query being conducted for electronic discovery. For example, at step 302 receiving module 104 may, as part of computing device 202 in FIG. 2, receive search query 210 for at least one instance of a user being identified within backup image 212 of a volume of data, where search query 210 is conducted for electronic discovery.

As used herein, the phrase "search query" may refer to any query, request, instruction, filter, configuration, and/or parameter for selecting a subset and/or summary of data from a set of data. As used herein, the phrase "volume of data" may refer to any distinctly identifiable collection of data. Examples of a volume of data include, without limitation, a file system partition, a logical volume, and/or a selected group of files. In some examples, the volume of data may correspond to a file server, a content management system (e.g., MICROSOFT SHAREPOINT), and/or a network-attached storage device. In some examples, the search query may be directed to one or more instances of the user being identified within the backup image of the volume of data by identifying files and/or other data objects owned and/or created by the user. For example, a file system may maintain metadata identifying an owner of each file, and a backup image of the file system may capture the metadata. Accordingly, the search query may be directed, at least in part, to files owned by the user at the time of backup.

As used herein, the phrase "electronic discovery" may refer to any process of locating potentially relevant information (e.g., relevant as evidence in a legal proceeding) within one or more volumes of data.

Receiving module 104 may receive the search query in any of a variety of contexts. For example, receiving module 104 may receive the search query from a user interface. Additionally or alternatively, receiving module 104 may receive the search query by intercepting a search query generated and/or transmitted by an application. In some examples, receiving module 104 may receive the search query from a search query generator (e.g., generating search queries relating to each of a list of subjects).

Figure 4:
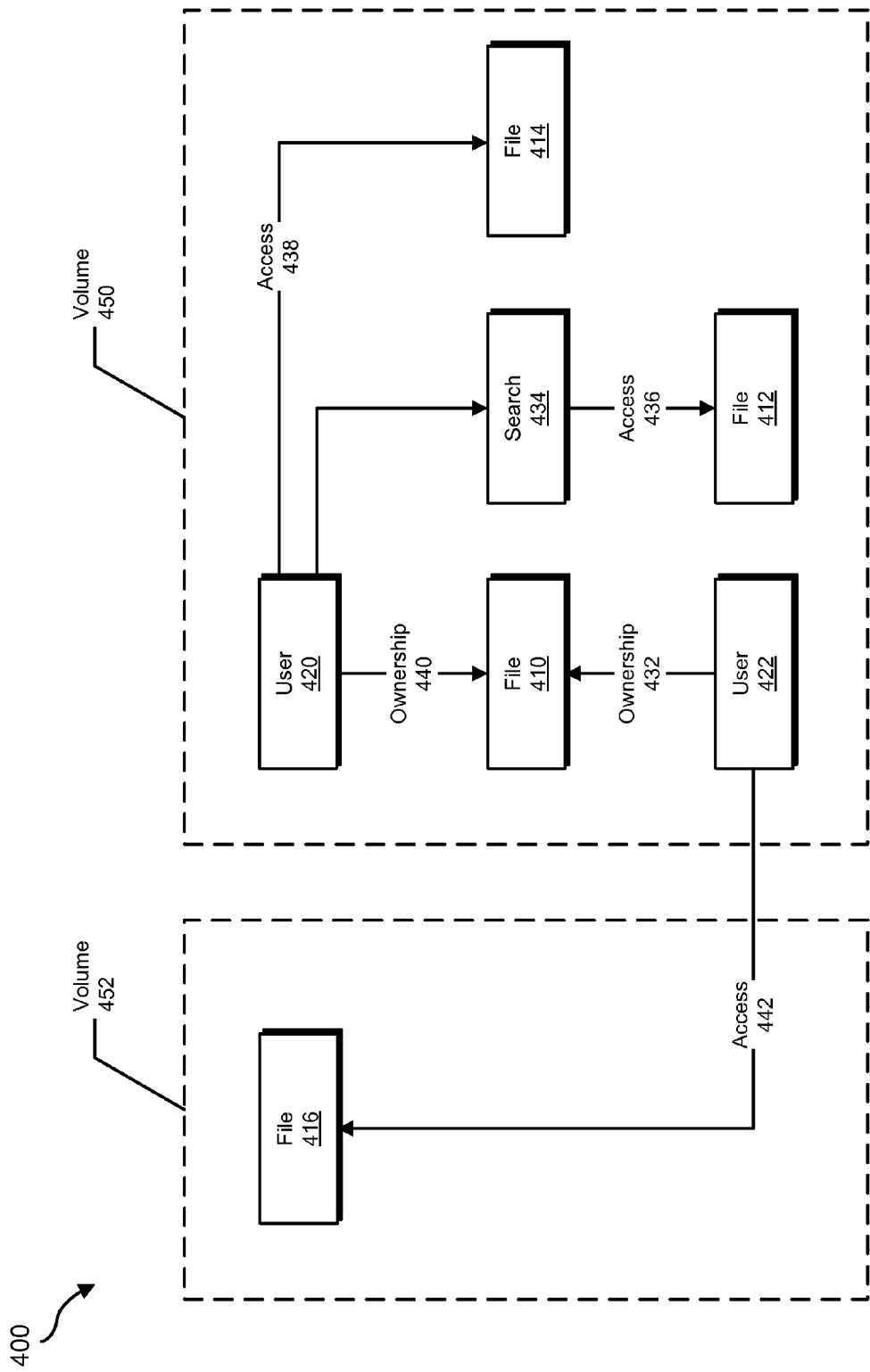
FIG. 4 is a diagram of an exemplary context for enhancing electronic discovery searches.

FIG. 4 illustrates an exemplary context 400 for enhancing electronic discovery searches. Using FIG. 4 as an example, at step 302 receiving module 104 may receive a search query directed to locating at least one instance of a user 420 being identified within a backup image of a volume 450.

Returning to FIG. 3, at step 304 one or more of the systems described herein may identify metadata associated with the backup image specifying at least one action performed by the user on a computing system while the volume of data was mounted for use on the computing system. For example, at step 304 identification module 106 may, as part of computing device 202 in FIG. 2, identify metadata 214 associated with backup image 212 specifying at least one action performed by the user on a computing system while the volume of data was mounted for use on the computing system.

Identification module 106 may identify the metadata in any of a variety of contexts and in any of a variety of formats. For example, identification module 106 may identify the metadata stored alongside the backup image. Additionally or alternatively, identification module 106 may identify the metadata stored within the backup image (e.g., the metadata having been captured on the computing system and stored on the volume of data up until the time of backup). In some examples, identification module 106 may identify the metadata stored in a storage system separate from the backup image. In some examples, the metadata may include tags corresponding to files and/or data objects. The tags may specify characteristics of individual files and/or data objects. Additionally or alternatively, the tags may specify relations between files, between users, and/or between files and users.

The metadata may specify any of a variety of actions performed by the user on the computing system. For example, the metadata may specify an attempt by a user to access (e.g., read from and/or write to) a file and/or data object. Additionally or alternatively, the metadata may specify a context in which a file and/or data object was accessed (e.g., an application through which a file was accessed). In some examples, the metadata may specify other users who previously owned a file and/or data object. Additionally or alternatively, the metadata may specify other volumes of data accessed by the user.

As shown in FIG. 4, context 400 may include actions taken by user 420 and relationships between files and users. For example, context 400 may include a search 434 by user 420 leading to an access 436 of a file 412 on volume 450 by user 420. Context 400 may also include an access 438 of a file 414 by user 420. Context 400 may additionally include an access 442 of a file 416 on a volume 452 by user 420. Context 400 may also include a record of a previous ownership 432 by a user 422 of a file 410 and a subsequent ownership 440 of file 410 by user 420. Using FIG. 4 as an example, at step 304 identification module 106 may identify metadata associated with a backup image of volume 450 that specifies search 434, access 436, access 438, access 442, and ownership 432. The metadata identification module 106 may therefore provide additional context to a backup image of volume 450, which may otherwise include the contents of files 410, 412, and 414, and possibly an identification of ownership 440.

Returning to FIG. 3, at step 306 one or more of the systems described herein may perform the search query on the backup image and receive a result of the search query in response to performing the search query. For example, at step 306 performing module 108 may, as part of computing device 202 in FIG. 2, perform search query 210 on backup image 212 and receive search result 220 of search query 210 in response to performing search query 210.

Performing module 108 may perform the search query in any suitable manner. For example, performing module 108 may parse the backup image for data matching the search query. Additionally or alternatively, performing module 108 may mount the backup image (or a copy of the backup image) and search the mounted backup image for data matching the search query. In some examples, the search query may only pertain to file system metadata (e.g., file names, user names, modification times, etc.). In these examples, performing module 108 may perform the search query on a directory listing of the backup image. In some examples, performing module 108 may perform the search query by forwarding the search query to a search engine. Generally, performing module 108 may use any appropriate technique for searching the backup image.

Performing module 108 may receive the result of the search query in any of a variety of formats. For example, performing module 108 may receive a list of files. In some examples, performing module 108 may receive the result of the search query after the search of the backup image is exhausted. Additionally or alternatively, performing module 108 may receive the result of the search query in real time (e.g., performing module 108 may receive portions of the result of the search query as they are discovered).

Returning to FIG. 3, at step 308 one or more of the systems described herein may enhance the result of the search query with contextual information relating to the search query based on the metadata, the contextual information facilitating further electronic discovery. For example, at step 308 enhancing module 110 may, as part of computing device 202 in FIG. 2, enhance search result 220 of search query 210 with contextual information 222 relating to search query 210 based on metadata 214 (e.g., resulting in an enhanced search result 224), where contextual information 222 may facilitate further electronic discovery.

As used herein, the phrase "contextual information" as it relates to the result of the search query may refer to any information that may improve the result of the search query for electronic discovery purposes. For example, the contextual information may include information about other files, data objects, users, and/or volumes of data related to a file, data object, user, and/or volume of data that appears in the result of the search query.

Enhancing module 110 may enhance the result of the search query in any of a variety of ways. For example, enhancing module 110 may enhance the result of the search query by suggesting a related search query based on the metadata. Using FIG. 4 as an example, the search query may relate to user 420 on volume 450. The results of the search query may include file 410 because user 420 was the owner of file 410 at the time of the backup of volume 450. Accordingly, enhancing module 110 may enhance the result of the search query by suggesting a search for user 422, because user 422 previously owned file 410. Additionally or alternatively, enhancing module 110 may suggest a search of volume 452, because user 422 accessed file 416 on volume 452.

Enhancing module 110 suggest the related search query in any of a variety of ways. For example, enhancing module 110 may include a textual message suggesting the related search query and the relationship between the result of the search query and the related search query. Additionally or alternatively, enhancing module 110 may provide a link and/or an option to perform the related search query in the result. In some examples, enhancing module 110 may suggest the related search query by providing the related search query as an option within a navigable interface displaying the result of the search query. Using FIG. 4 as an example, the search query may relate to user 420 on volume 450. Enhancing module 110 may therefore display file 410 within a navigable interface. In some examples, the navigable interface may show relationships between user 420 and other files (e.g., search 434 by user 420, access 438 of file 414 by user 420, etc.) and/or relationships between file 410 and other users (e.g., previous ownership 432 of file 410 by user 422). In some examples, the navigable interface may allow a user to browse through the context of the search result (e.g., context 400) by allowing a selection of one of the elements of the result (e.g., a file, a user, a volume, etc.) and showing relations between the selected elements and other elements based on the metadata. This may allow a user to further navigate to one or more of the other elements. In some examples, the user may select two or more elements (e.g., a file and a user) to restrict the navigable search to elements that share a relation with all selected elements.

In some examples, enhancing module 110 may enhance the results of the search query by performing an additional search on the backup image based on the metadata and including a result of the additional search within the result of the search query. Enhancing module 110 may perform the additional search based on any of a variety of factors relating to the metadata. For example, the metadata may show that a file, user, and/or volume of data is heavily connected to an element in the search query and/or a result of the search query (e.g., if numerous and/or heavily weighted relations are specified by the metadata). Accordingly, enhancing module 110 may perform the additional search for the heavily connected file, user, and/or volume of data.

Enhancing module 110 may enhance the result of the search query using any of a variety of information. For example, enhancing module 110 may identify a file identifier within the result of the search query, determine that the action performed by the user was performed on a file corresponding to the file identifier, and then contextualize the file identifier within the result of the search query with a representation of the action. Enhancing module 110 may contextualize the representation of the action in any of a variety of ways. For example, as mentioned earlier, enhancing module 110 may display the action as a relation between the user and the file in a navigable interface. Additionally or alternatively, enhancing module 110 may add descriptive text regarding the action to the listing of the file within the search result. In some examples, enhancing module 110 may further contextualize the representation of the action within a sequence of actions performed by the user on the computing system. For example, in displaying the action, enhancing module 110 may display one or more actions taken by the user before the action and/or one or more actions taken by the user after the action. In some examples, enhancing module 110 may contextualize the representation of the action within a sequence of actions performed by the user on the computing system that facilitated the action performed by the user on the file. For example, enhancing module 110 may identify, within the metadata, one or more actions taken by the user before the action that are causally linked with the action.

Using FIG. 4 as an example, enhancing module 110 may enhance the result with a representation that user 420 performed access 436 on file 412 and then access 438 on file 414. Additionally or alternatively, enhancing module 110 may enhance the result with a representation that user 420 performed search 434 and that search 434 facilitated access 436 of file 412.

In some examples, enhancing module 110 may enhance the result of the search query with information relating to one or more additional users. For example, enhancing module 110 may identify a file identified within the result of the search query which was owned by the user at the time that the backup image. Enhancing module 110 may then identify, within the metadata, an identifier of at least one additional user that owned the file prior to the user owning the file. Enhancing module 110 may, as a result, include an indicator that the additional user owned the file prior to the user within the result of the search query. Using FIG. 4 as an example, enhancing module 110 identify file 410 as owned by user 420 at the time of the backup image of volume 450. Enhancing module 110 may then identify user 422 as previously owning file 410. Enhancing module 110 may therefore enhance the result of the search query by identifying user 422 as a previous owner of file 410. In some examples, enhancing module 110 may enhance the result to include a life-cycle of a file. For example, the life-cycle of the file may include owners of the file and/or attempts to access the file.

In some examples, enhancing module 110 may enhance the result of the search query with information relating to one or more additional volumes. For example, enhancing module 110 may identify a file identified within the result of the search query which was owned by the user at the time that the backup image. Enhancing module 110 may then identify, based the metadata, at least one additional volume of data accessed by the user. Enhancing module 110 may then include a representation of the additional volume of data within the result of the search query. For example, the metadata may specify that the user accessed a content management system from the computing system. Enhancing module 110 may then enhance the result of the search query with a representation of this event in any of a variety of ways, including as a part of a navigable interface (e.g., allowing the user to browse users, data objects, actions, and/or relations within a backup image of the content management system), as a suggested related search query (e.g., a suggestion to search a backup image of the content management system), and/or a listing and/or descriptive text of the content management system.

Returning to FIG. 3, at step 310 one or more of the systems described herein may provide the enhanced result of the search query. For example, at step 310 providing module 112 may, as part of computing device 202 in FIG. 2, provide enhanced search result 224 of search query 210 (e.g., as a response to search query 210).

Providing module 112 may provide the enhanced result of the search query in any of a variety of ways. For example, providing module 112 may relay the enhanced result of the search query to a system that submitted the search query. Additionally or alternatively, providing module 112 may render and/or display the enhanced result of the search query. In some examples, providing module 112 may dynamically provide the enhanced result of the search query (e.g., using a navigable interface as described earlier). After step 310, method 300 may terminate.

Figure 5:
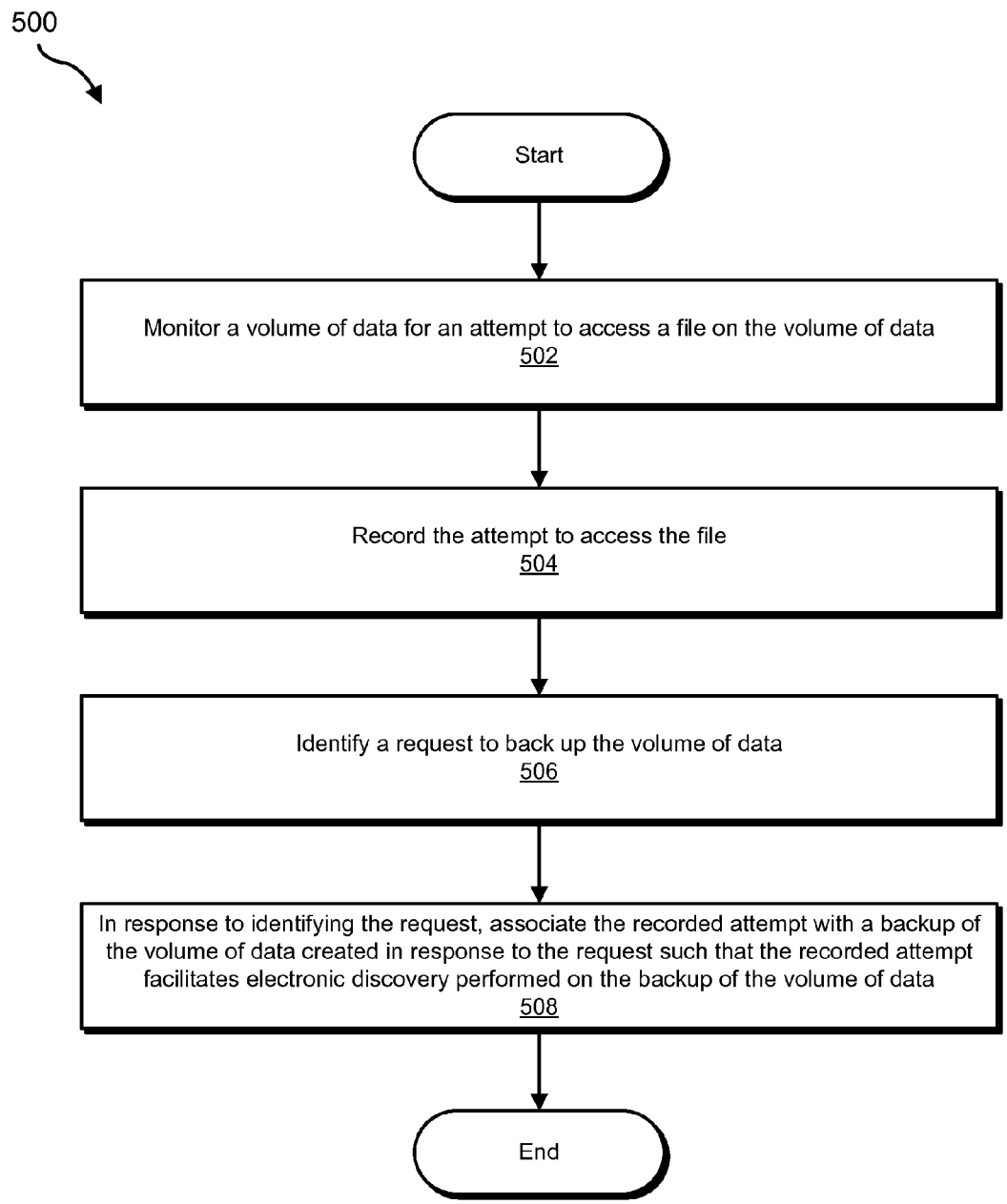
FIG. 5 is a flow diagram of an exemplary method for enhancing electronic discovery searches.

FIG. 5 is a flow diagram of an exemplary computer-implemented method 500 for enhancing electronic discovery searches. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

As shown in FIG. 5, at step 502 one or more of the systems described herein may monitor a volume of data (e.g., the volume of data recited in step 302 of FIG. 3) for an attempt to access a file of the volume of data. For example, an enhancing module may operate as a part of a computing system (e.g., the computing system recited in step 304 of FIG. 3). In some examples, the enhancing module may operate as a part of and/or communicate with a filter driver on the computing system. Accordingly, the enhancing module may observe attempts to access files on the volume of data. Additionally or alternatively, the enhancing module may parse one or more log files to monitor the volume of data for attempts to access files. In some examples, the enhancing module may monitor network connections to identify attempts to access files on remote volumes of data.

At step 504 one or more of the systems described herein may record the attempt to access the file. For example, the enhancing module may record the attempt to access the file in a metadata store on the volume of data. Additionally or alternatively, the enhancing module may record the attempt to access the file in a separate volume of data.

The enhancing module may record the attempt to access the file with any of a variety of additional contextual information. For example, the enhancing module may record an identifier of a user account that attempted to access the file. In some examples, the enhancing module may also record a time of the attempt. Additionally or alternatively, the enhancing module may record contextual information specifying a context that facilitated the attempt to access the file and that is not reflected in the backup. For example, the enhancing module may record one or more actions by the user that facilitated the attempt to access the file. In this example, the enhancing module may record a search performed by the user that presented the file as a result. For example, the enhancing module may identify a user that performed to access the file, identify a search query performed by the user on at least a portion of the volume of data before the attempt, and record an association between the search query and the attempt. Additionally or alternatively, the enhancing module may record a browsing path taken by the user that led to the file.

In some examples, the enhancing module may contextualize the attempt to access the file with other actions by the user. For example, the enhancing module may identify a user that performed the attempt to access the file. The enhancing module may then record at least one additional attempt by the user to access an additional file and associate the attempt to access the file with the additional attempt to access the additional file. Accordingly, by identifying the record of the attempt to access the file, a user and/or search engine may be able to quickly identify other files accessed by the same user. In some examples, the enhancing module may also record sequential information specifying an order in which the attempt and the additional attempt occurred. In some examples, the enhancing module may thereby facilitate the construction of a timeline for the user's actions.

At step 506 one or more of the systems described herein may identify a request to back up the volume of data. For example, the enhancing module may receive a message from a backup system identifying the request. Additionally or alternatively, the enhancing module may read a configuration file identifying a scheduled backup. In some examples, the enhancing module may operate as a part of a backup system and identify the request by processing the request. Additionally or alternatively, the enhancing module may monitor a backup system to determine that the volume of data is being backed up.

At step 508 one or more of the systems described herein may, in response to identifying the request, associate the recorded attempt with a backup of the volume of data created in response to the request such that the recorded attempt facilitates electronic discovery performed on the backup of the volume of data. For example, the enhancing module may store the recorded attempt in a metadata store alongside the backup. Additionally or alternatively, the enhancing module may store the recorded attempt within the backup image (e.g., by recording the attempt on the volume of data and allowing the recorded attempt to be backed up along with the rest of the volume). In some examples, the enhancing module may store the recorded attempt in a storage system separate from the backup. After step 508, method 500 may terminate.

As explained above, by using contextual information that links actions that were performed on backed up data over time (e.g., to provide contextualize search results, suggest additional searches, and/or perform additional searches), the systems and methods described herein may enable more efficient, thorough, and/or informative electronic discovery searches, thereby potentially saving organizations time and expenses during a discovery process and/or litigation.

Figure 6:
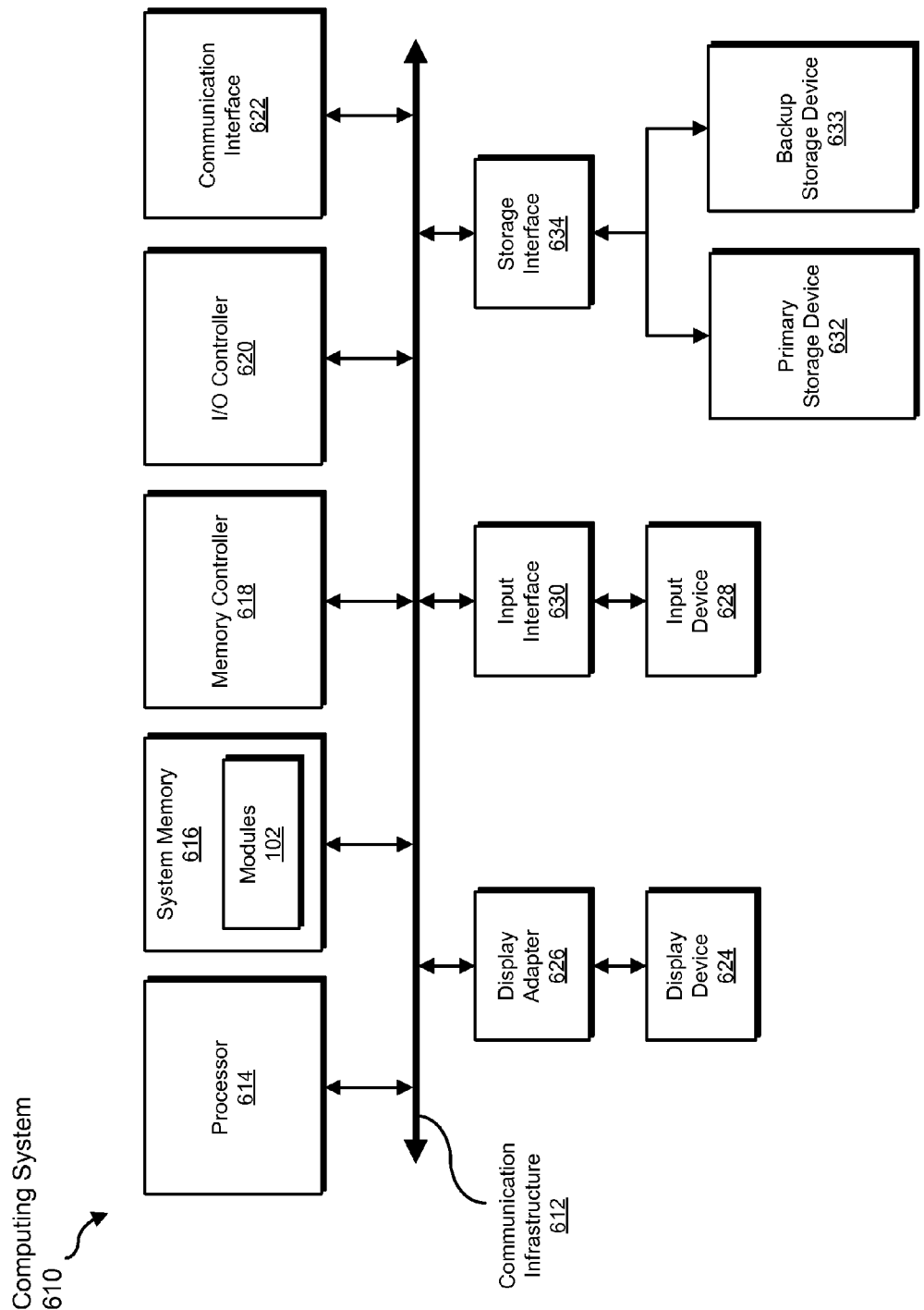
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the receiving, identifying, performing, enhancing, suggesting, providing, determining, contextualizing, including, monitoring, recording, and/or associating steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
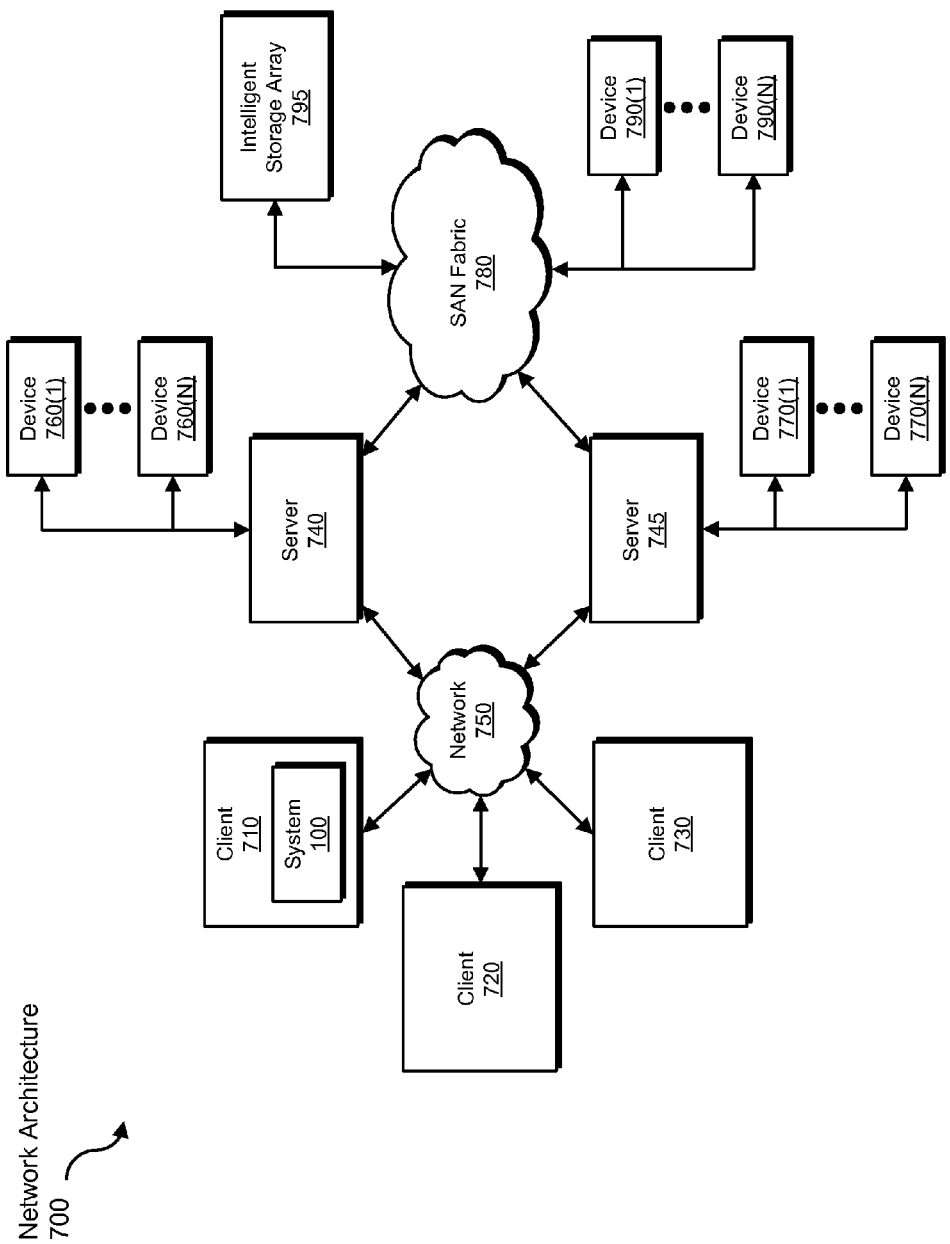
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the receiving, identifying, performing, enhancing, suggesting, providing, determining, contextualizing, including, monitoring, recording, and/or associating steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760 (1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enhancing electronic discovery searches.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system to a system for enhanced electronic discovery. As another example, one or more of the modules recited herein may transform a backup image into a backup image enhanced for electronic discovery.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enhancing electronic discovery searches, at least a portion of the method being performed by a computing device comprising at least one processor, the method comprising:

receiving a search query for at least one instance of a user being identified within a backup image of a volume of data, the search query being conducted for electronic discovery;

identifying metadata associated with the backup image specifying at least one action performed by the user on a computing system while the volume of data was mounted for use on the computing system;

performing the search query on the backup image and receiving a result of the search query in response to performing the search query;

enhancing the result of the search query with contextual information relating to the search query based on the metadata in response to determining that the user specified in the search query performed the action, the contextual information facilitating further electronic discovery relating to the user by specifying a context in which the user performed the action on the computing system while the volume of data was mounted for use on the computing system; and providing the enhanced result of the search query.

2. The computer-implemented method of claim 1, wherein enhancing the result of the search query comprises at least one of:

suggesting a related search query based on the metadata; and performing an additional search on the backup image based on the metadata and including a result of the additional search with the result of the search query.

3. The computer-implemented method of claim 2, wherein suggesting the related search query comprises providing the related search query as an option within a navigable interface displaying the result of the search query.

4. The computer-implemented method of claim 1, wherein enhancing the result of the search query comprises:

identifying a file identifier within the result of the search query;

determining that the action performed by the user was performed on a file corresponding to the file identifier; and contextualizing the file identifier within the result of the search query with a representation of the action.

5. The computer-implemented method of claim 4, wherein enhancing the result of the search query further comprises contextualizing the representation of the action within a sequence of actions performed by the user on the computing system.

6. The computer-implemented method of claim 4, wherein enhancing the result of the search query further comprises contextualizing the representation of the action within a sequence of actions performed by the user on the computing system that facilitated the action performed by the user on the file.

7. The computer-implemented method of claim 1, wherein enhancing the result of the search query comprises:

identifying a file identified within the result of the search query which was owned by the user at the time that the backup image was generated;

identifying, within the metadata, an identifier of at least one additional user that owned the file prior to the user owning the file; and including an indicator that the additional user owned the file prior to the user within the result of the search query.

8. The computer-implemented method of claim 1, wherein enhancing the result of the search query further comprises:

identifying, based on the metadata, at least one additional volume of data accessed by the user; and including a representation of the additional volume of data within the result of the search query.

9. A system for enhancing electronic discovery searches, the system comprising:

a receiving module programmed to receive a search query for at least one instance of a user being identified within a backup image of a volume of data, the search query being conducted for electronic discovery;

an identification module programmed to identify metadata associated with the backup image specifying at least one action performed by the user on a computing system while the volume of data was mounted for use on the computing system;

a performing module programmed to perform the search query on the backup image and receive a result of the search query in response to performing the search query;

an enhancing module programmed to enhance the result of the search query with contextual information relating to the search query based on the metadata in response to determining that the user specified in the search query performed the action, the contextual information facilitating further electronic discovery relating to the user by specifying a context in which the user performed the action on the computing system while the volume of data was mounted for use on the computing system;

a providing module programmed to provide the enhanced result of the search query; and at least one processor configured to execute the receiving module, identification module, the performing module, the enhancing module, and the providing module.

10. The system of claim 9, wherein the enhancing module is programmed to enhance the result of the search query by at least one of:

suggesting a related search query based on the metadata; and performing an additional search on the backup image based on the metadata and including a result of the additional search with the result of the search query.

11. The system of claim 10, wherein the enhancing module is programmed to suggest the related search query by providing the related search query as an option within a navigable interface displaying the result of the search query.

12. The system of claim 9, wherein the enhancing module is programmed to enhance the result of the search query by:

identifying a file identifier within the result of the search query;

determining that the action performed by the user was performed on a file corresponding to the file identifier; and contextualizing the file identifier within the result of the search query with a representation of the action.

13. The system of claim 12, wherein the enhancing module is further programmed to enhance the result of the search query by contextualizing the representation of the action within a sequence of actions performed by the user on the computing system.

14. The system of claim 12, wherein the enhancing module is further programmed to enhance the result of the search query by contextualizing the representation of the action within a sequence of actions performed by the user on the computing system that facilitated the action performed by the user on the file.

15. A non-transitory computer-readable-storage medium comprising one or more computer-readable instructions that, when executed by at least one processor of a computing device, cause the computing device to:

receive a search query for at least one instance of a user being identified within a backup image of a volume of data, the search query being conducted for electronic discovery;

identify metadata associated with the backup image specifying at least one action performed by the user on a computing system while the volume of data was mounted for use on the computing system;

perform the search query on the backup image and receiving a result of the search query in response to performing the search query;

enhance the result of the search query with contextual information relating to the search query based on the metadata in response to determining that the user specified in the search query performed the action, the contextual information facilitating further electronic discovery relating to the user by specifying a context in which the user performed the action on the computing system while the volume of data was mounted for use on the computing system; and provide the enhanced result of the search query.

16. The non-transitory computer-readable-storage medium of claim 15, wherein enhancing the result of the search query comprises at least one of:

suggesting a related search query based on the metadata; and performing an additional search on the backup image based on the metadata and including a result of the additional search with the result of the search query.

17. The non-transitory computer-readable-storage medium of claim 16, wherein suggesting the related search query comprises providing the related search query as an option within a navigable interface displaying the result of the search query.

18. The non-transitory computer-readable-storage medium of claim 15, wherein enhancing the result of the search query comprises:

identifying a file identifier within the result of the search query;

determining that the action performed by the user was performed on a file corresponding to the file identifier; and contextualizing the file identifier within the result of the search query with a representation of the action.

19. The non-transitory computer-readable-storage medium of claim 18, wherein enhancing the result of the search query further comprises contextualizing the representation of the action within a sequence of actions performed by the user on the computing system.

20. The non-transitory computer-readable-storage medium of claim 18, wherein enhancing the result of the search query further comprises contextualizing the representation of the action within a sequence of actions performed by the user on the computing system that facilitated the action performed by the user on the file.

\* \* \* \* \*